US007733296B2

(12) United States Patent
Lee et al.

(10) Patent No.: US 7,733,296 B2
(45) Date of Patent: Jun. 8, 2010

(54) DRIVING METHOD OF THREE-DIMENSIONAL DISPLAY DEVICE

(75) Inventors: Hyo-Jin Lee, Yongin-si (KR); Jang-Doo Lee, Yongin-si (KR); Ja-Seung Ku, Yongin-si (KR); Hui Nam, Yongin-si (KR); Hyoung-Wook Jang, Yongin-si (KR); Beom-Shik Kim, Yongin-si (KR); Myoung-Seop Song, Yongin-si (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 719 days.

(21) Appl. No.: 11/606,501

(22) Filed: Nov. 28, 2006

(65) Prior Publication Data

US 2007/0146233 A1 Jun. 28, 2007

(30) Foreign Application Priority Data

Dec. 22, 2005 (KR) ............... 10-2005-0127720

(51) Int. Cl.
*G09G 5/00* (2006.01)
(52) U.S. Cl. ............... 345/6; 345/7; 345/9; 345/32; 349/15; 349/141; 359/462
(58) Field of Classification Search ............... 345/6, 345/7, 9, 32, 43, 103, 109; 348/59, 51, 56, 348/57; 349/15, 141; 359/462
See application file for complete search history.

(56) References Cited

U.S. PATENT DOCUMENTS 4,710,768 A 12/1987 Takeda et al.

5,493,427 A * 2/1996 Nomura et al. ............... 349/5
6,094,216 A * 7/2000 Taniguchi et al. ............ 348/51
6,137,456 A * 10/2000 Bhagavatula et al. .......... 345/7

(Continued)

FOREIGN PATENT DOCUMENTS

EP 1 087 627 A2 3/2001

(Continued)

OTHER PUBLICATIONS

Patent Abstracts of Japan, Publication No. 2000-284223, dated Oct. 13, 2000, in the name of Koyo Yuasa et al.

(Continued)

*Primary Examiner*—Amare Mengistu
*Assistant Examiner*—Dmitriy Bolotin
(74) *Attorney, Agent, or Firm*—Christie, Parker & Hale, LLP

(57) ABSTRACT

A three-dimensional display device includes an image display portion for time-sharing a left eye image and a right eye image, and a parallax barrier for separating the left and right eye images provided from the image display portion into a direction of a left eye and a right eye of a user, respectively, by using a first and a second electrode set.

A method includes applying a first driving voltage to the first electrode set during a first period, and applying a second driving voltage to the second electrode set during a second period. The second driving voltage has a level different from that of the first driving voltage.

16 Claims, 12 Drawing Sheets

U.S. PATENT DOCUMENTS

| | | | |
|---|---|---|---|
| 7,511,774 B2* | 3/2009 | Lee et al. | 349/15 |
| 2002/0114072 A1* | 8/2002 | Hong | 359/464 |
| 2004/0263968 A1* | 12/2004 | Kobayashi et al. | 359/462 |
| 2006/0021585 A1* | 2/2006 | Hurwitz | 119/795 |
| 2006/0082519 A1* | 4/2006 | Nam et al. | 345/9 |

FOREIGN PATENT DOCUMENTS

| | | |
|---|---|---|
| EP | 1 650 983 A1 | 4/2006 |
| EP | 1 758 406 A2 | 2/2007 |
| JP | 2000-284223 A | 10/2000 |
| JP | 2000-284224 A | 10/2000 |
| KR | 10-1999-0085280 | 12/1999 |

OTHER PUBLICATIONS

Patent Abstracts of Japan, Publication No. 2000-284224, dated Oct. 13, 2000, in the name of Hitoshi Kuma et al.

Korean Patent Abstracts, Publication No. 10-1999-0085280, dated Dec. 6, 1999, in the name of Soon-Young Lee.

European Search Report dated Apr. 26, 2007 for the corresponding European Patent Application No. 06127021.1.

* cited by examiner

DRIVING METHOD OF THREE-DIMENSIONAL DISPLAY DEVICE

CROSS-REFERENCE TO RELATED APPLICATION

This application claims priority to and the benefit of Korean Patent Application No. 10-2005-0127720, filed in the Korean Intellectual Property Office, on Dec. 22, 2005, the entire content of which is incorporated herein by reference.

BACKGROUND OF THE INVENTION

1. Field of the Invention

The present invention relates to a driving method of a three-dimensional display device, and in particular, to a driving method of an autostereoscopic three-dimensional display device using a parallax barrier.

2. Description of the Related Art

A three-dimensional display device may be categorized as a stereoscopic display device where a user wears a viewing aid such as polarizing glasses, or an autostereoscopic display device where the user can see a desired three-dimensional image without wearing such a viewing aid.

A common autostereoscopic display device utilizes an optical separation element such as a lenticular lens, a parallax barrier, or a microlens array, to spatially separate or isolate the left-eye image part and the right-eye image part displayed at an image display unit in the directions of the left and right eyes of the user, respectively.

In particular, the parallax barrier may be formed with a liquid crystal shutter utilizing a transmission type liquid crystal display, and in this case, it may be converted between a two-dimensional mode and a three-dimensional mode. Thus the parallax barrier can be applied to laptop computers or cellular phones.

Generally, the parallax barrier includes stripe-shaped light interception portions and light transmission portions. It selectively separates left and right eye images displayed at the image display unit through the light transmission portions such that the left and right eye images are respectively provided to the left and right eyes of the user.

A common three-dimensional display device having a parallax barrier displays left and right eye images according to left and right image signals inputted to pixels of the image display portion, and it separates the left and right eye images spatially by using the parallax barrier.

However, since the left and right images are entered into the respective eyes of the user, the resolution of a three-dimensional image is no more than half as fine as that of a two-dimensional image.

To solve this problem, a time-sharing type of three-dimensional display device has been developed.

An image display portion of the time-sharing type of three-dimensional display device shows patterns of left and right eye images, and the patterns of the left and right eye images are changed alternately at regular time intervals. Patterns of the light interception portions and the light transmission portions of the parallax barrier are changed alternately at the regular time intervals.

Accordingly, the time-sharing type of three-dimensional display device provides left and right images having patterns that are opposite to each other at certain time intervals to the left and right eyes of the user, respectively.

Consequently, the time-sharing type of three-dimensional display device provides a three-dimensional image having a resolution that is equal (or substantially equal) to that of a two-dimensional image.

The parallax barrier of the time-sharing type of three-dimensional display device may be formed with a liquid crystal shutter utilizing a transmission type of liquid crystal display, and the liquid crystal display may include first electrodes and second electrodes formed in a striped pattern and arranged alternately and repeatedly relative to each other.

Light transmittance rates for portions of the parallax barrier corresponding to each of the electrodes should be substantially uniform to enable the user to see images having a regular (or uniform) brightness during operation of the time-sharing type of three-dimensional display device.

However, it is difficult for the time-sharing type of three-dimensional display device to maintain a uniform light transmittance rate due to differences in lengths of electrode paths along which applied voltages are conducted.

SUMMARY OF THE INVENTION

It is an aspect of the present invention to provide a driving method for a time-sharing type of three-dimensional display device that can maintain the same (or a uniform) light transmittance rate at portions of a parallax barrier of the display device corresponding to electrodes of the display device during operation of the device.

In exemplary embodiments according to the present invention, a driving method of a three-dimensional display device with one or more of the following features is provided.

A three-dimensional display device includes an image display portion adapted to time-share an image to display a left eye image and a right eye image, and a parallax barrier for receiving the left eye image and the right eye image from the image display portion and for directing the left eye image and the right eye image towards a left eye and a right eye of a user, respectively, by operating a first electrode set and a second electrode set of the parallax barrier.

A driving method includes applying a first driving voltage to the first electrode set during a first period, the first driving voltage having a first level, and applying a second driving voltage to the second electrode set during a second period, the second driving voltage having a second level, wherein the second level is different from the first level.

The parallax barrier may include a first substrate on which the first electrode set and the second electrode set are arranged, a second substrate facing the first substrate, a common electrode located on the second substrate, and a liquid crystal layer located between the first substrate and the second substrate.

The first electrode set may include a plurality of first electrodes, a first connection electrode for electrically connecting the first electrodes, a first terminal electrode connected at an end of the first connection electrode, and a first connection terminal connected to an end of the first terminal electrode and adapted to receive the first driving voltage.

The second electrode set may include a plurality of second electrodes, a second connection electrode for electrically connecting the second electrodes, and a second connection terminal connected to an end of the second connection electrode and adapted to receive the second driving voltage.

The applying the first driving voltage to the first electrode set may include applying the first driving voltage at the first connection terminal, and the applying the second driving voltage to the second electrode set may include applying the second driving voltage at the second connection terminal.

The first level may be set higher than the second level.

The first level may be set to have a range from about 1.5 to 2 times the second level.

The driving method may include displaying on the image display portion, during the first period, a first image including the left and right eye images formed in a first pattern, and displaying on the image display portion, during the second period, a second image including the left and right eye images formed in a second pattern, wherein the second pattern is opposite to the first pattern.

The driving method may include forming first pixel columns and second pixel columns respectively corresponding to the first electrodes and the second electrodes. The displaying the first image may include displaying the left eye image of the first image on the first pixel columns and displaying the right eye image of the first image on the second pixel columns. The displaying the second image may include displaying the right eye image of the second image on the first pixel columns and displaying the left eye image of the second image on the second pixel columns.

A three-dimensional display device may include an image display portion capable of being oriented in a first mode to provide a portrait-type view and in a second mode to provide a landscape-type view and is adapted to time-share an image to display a left eye image and a right eye image in a time-shared manner. The three-dimensional display device may also include a parallax barrier having a first electrode set and a second electrode set arranged to extend along a first direction and further having a third electrode set and a fourth electrode set arranged to extend along a second direction perpendicular to the first direction.

The parallax barrier may be adapted to receive the left eye image and the right eye image from the image display portion and to direct the left eye image and the right eye image towards a left eye and a right eye of a user, respectively.

A driving method may include, in the first mode, applying a first driving voltage to the first electrode set during a first period, the first driving voltage having a first level, and applying a second driving voltage to the second electrode set during a second period, the second driving voltage having a second level different from the first level. The driving method may also include, in the second mode, applying a third driving voltage to the third electrode set during the first period, the third driving voltage having a third level, and applying a fourth driving voltage to the fourth electrode set during the second period, the fourth driving voltage having a fourth level different from the third level.

The parallax barrier may include a first substrate on which the first electrode set and the second electrode set are arranged, a second substrate on which the third electrode set and the fourth electrode set are arranged, the second substrate facing the first substrate, and a liquid crystal layer located between the first substrate and the second substrate.

The first electrode set may include a plurality of first electrodes, a first connection electrode for electrically connecting the first electrodes, a first terminal electrode connected at an end of the first connection electrode, and a first connection terminal connected to an end of the first terminal electrode and adapted to receive the first driving voltage.

The second electrode set may include a plurality of second electrodes, a second connection electrode for electrically connecting the second electrodes, and a second connection terminal connected to an end of the second connection electrode and adapted to receive the second driving voltage.

The third electrode set may include a plurality of third electrodes, a third connection electrode for electrically connecting the third electrodes, and a third connection terminal connected to an end of the third connection electrode and adapted to receive the third driving voltage.

The fourth electrode set may include a plurality of fourth electrodes, a fourth connection electrode for electrically connecting the fourth electrodes, a fourth terminal electrode connected to an end of the fourth connection electrode, and a fourth connection terminal connected to an end of the fourth terminal electrode and adapted to receive the fourth driving voltage.

In the first mode, the applying the first driving voltage to the first electrode set during the first period may include applying the first driving voltage at the first connection terminal, and the applying the second driving voltage to the second electrode set may include applying the second driving voltage at the second connection terminal during the second period. In the second mode, the applying the third driving voltage to the third electrode set may include applying the third driving voltage at the third connection terminal, and the applying the fourth driving voltage to the fourth electrode set may include applying the fourth driving voltage at the fourth connection terminal.

In the first mode, the first level may be set higher than the second level, and, in the second mode, the fourth level may be set higher than the third level.

By way of example, the first level may be set to have a range from about 1.5 to 2 times the second level, and the fourth level may be set to have a range from about 1.5 to 2 times the third level.

The driving method may include, in the first mode, displaying on the image display portion, during the first period, a first image including the left and right eye images formed in a first pattern and displaying on the image display portion, during the second period, a second image including the left and right eye images formed in a second pattern, wherein the second pattern is opposite to the first pattern. The driving method may also include, in the second mode, displaying on the image display portion, during the first period, a third image including the left and right eye images formed in a third pattern and displaying on the image display portion, during the second period, a fourth image including the left and right eye images formed in a fourth pattern, wherein the fourth pattern is opposite to the third pattern.

The driving method may include, in the first mode, forming first pixel columns and second pixel columns respectively corresponding to the first electrodes and the second electrodes. The displaying the first image during the first period may include displaying the left eye image of the first image on the first pixel columns and displaying the right eye image of the first image on the second pixel columns. The displaying the second image during the second period may include displaying the right eye image of the second image on the first pixel columns and displaying the left eye image of the second image on the second pixel columns. The driving method may also include, in the second mode, forming first pixel rows and second pixel rows respectively corresponding to the third electrodes and the fourth electrodes. The displaying the third image during the first period may include displaying the left eye image of the third image on the first pixel rows and displaying the right eye image of the third image on the second pixel rows. The displaying the fourth image during the second period may include displaying the right eye image of the fourth image on the first pixel rows and displaying the left eye image of the fourth image on the second pixel rows.

According to the driving method of the present invention, degradation of the quality of a three-dimensional image due to differences in lengths of electrode paths along which applied voltages are conducted can be prevented in a time-sharing type of three-dimensional display device.

DETAILED DESCRIPTION

The present invention will be described more fully hereinafter with reference to the accompanying drawings, in which certain exemplary embodiments of the present invention are shown.

Figure 1:
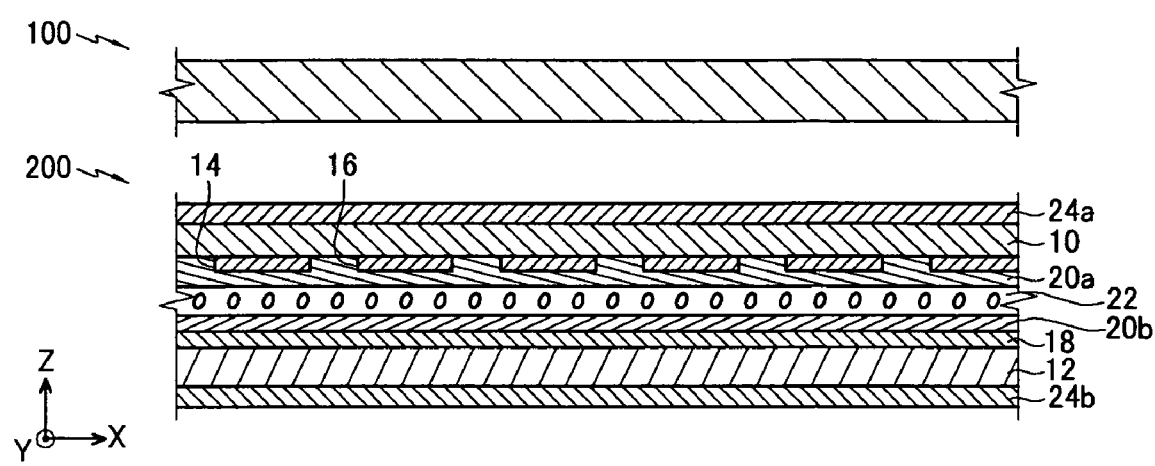
FIG. 1 is a sectional view of a three-dimensional display device operated by a driving method according to a first exemplary embodiment of the present invention.

FIG. 1 is a sectional view of a three-dimensional display device operated by a driving method according to a first exemplary embodiment of the present invention.

As shown in FIG. 1, the three-dimensional display device includes an image display portion 100 and a parallax barrier 200 facing the image display portion 100.

The image display portion 100 displays a left eye image and a right eye image that have certain or predetermined patterns. First and second images that have different patterns of the left and right eye images relative to each other are repeatedly displayed at a frequency, which may be predetermined.

Any suitable display device may be used as the image display portion 100. For instance, the image display portion 100 may be formed with a cathode ray tube, a liquid crystal display, a plasma display panel, a field emission display device, an organic electroluminescence display device, or any other suitable display device.

The parallax barrier 200 may be formed with a liquid crystal shutter. The parallax barrier 200 includes a first substrate 10 and a second substrate 12 facing each other. Electrodes for driving a liquid crystal layer 22 disposed between the first and second substrates 10 and 12 are formed (or arranged) on or at respective inner surfaces of the first and second substrates.

The first and second substrates 10 and 12 may be formed of rectangular glass.

First electrodes 14 and second electrodes 16 are formed on the first substrate 10, and a common electrode 18 is formed on the second substrate 12. The common electrode 18 may be formed as a single-body electrode.

The electrodes 14, 16, and 18 may be formed with a transparent material, such as Indium Tin Oxide (ITO), and a pair of polarizing plates 24a and 24b are formed on (or at) respective outer surfaces of the first and second substrates 10 and 12, respectively.

A pair of alignment layers 20a and 20b, covering the electrodes 14, 16, and 18, are formed on the first and second substrates 10 and 12, respectively.

Structures of the electrodes formed on the first substrate 10 will be described more fully hereinafter in more detail.

Figure 2:
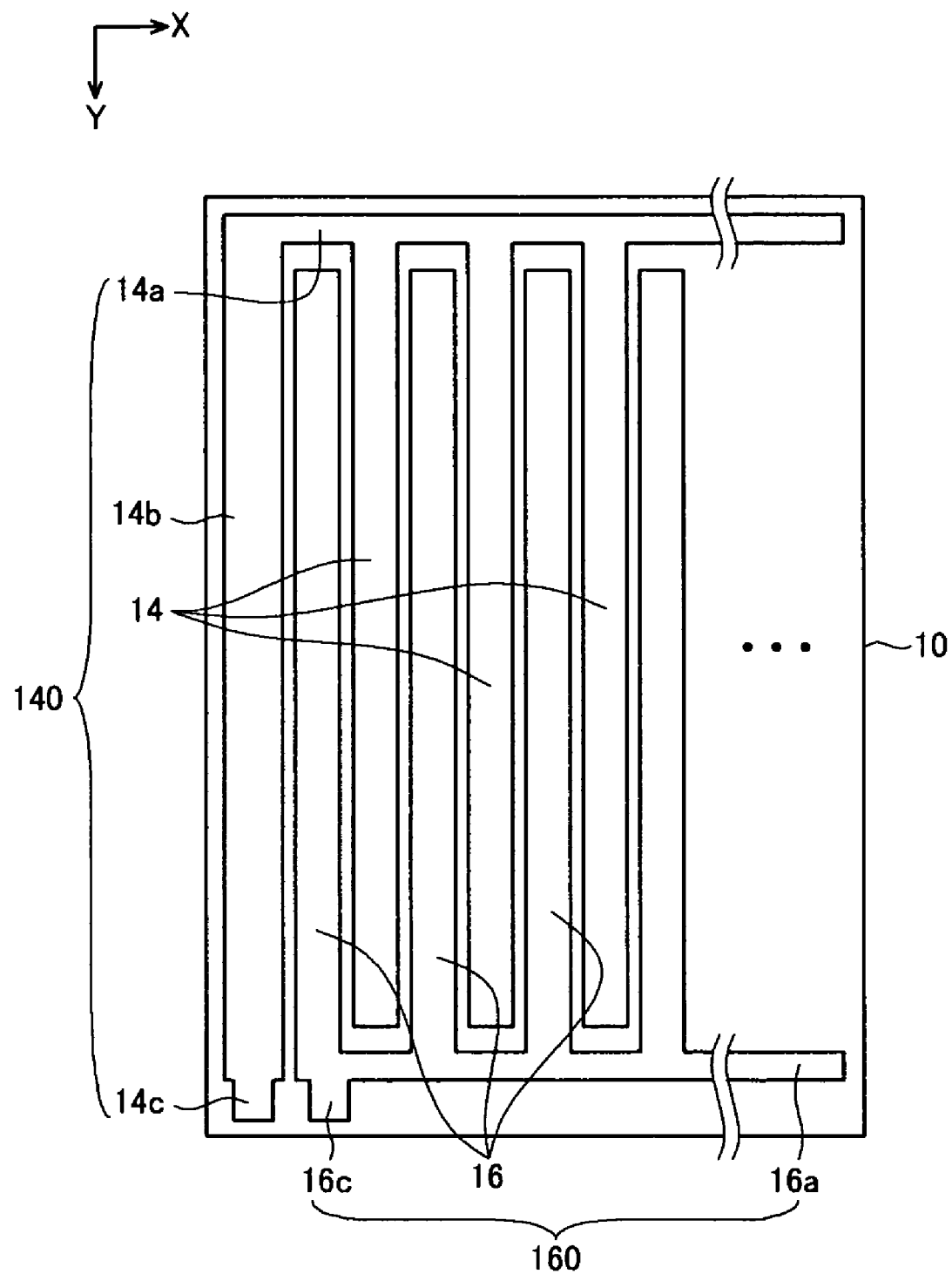
FIG. 2 is a plan view of electrodes arranged on a first substrate.

FIG. 2 shows a structure of a first electrode set 140 and a second electrode set 160 formed on the first substrate 10.

As shown in FIG. 2, the first electrode set 140 includes a plurality of the first electrodes 14 formed to extend along a direction corresponding to a longer side of the first substrate 10 (the direction of the Y-axis in FIG. 2), a first connection electrode 14a electrically connecting the first electrodes 14, a first terminal electrode 14b formed to extend along a direction parallel to the first electrodes 14 on an end of the first connection electrode 14a, and a first connection terminal 14c formed on an end of the first terminal electrode 14b.

The first electrodes 14 are arranged in a striped pattern with certain or predetermined distances therebetween on the first substrate 10.

The second electrode set 160 includes a plurality of the second electrodes 16 arranged to extend along a direction corresponding to the longer side of the first substrate 10, a second connection electrode 16a electrically connecting the second electrodes 16, and a second connection terminal 16c located on an end of the second connection electrode 16a.

Each of the second electrodes 16 are arranged between the first electrodes 14 along the direction corresponding to the longer side of the first substrate 10 in a striped pattern.

Figure 3A:
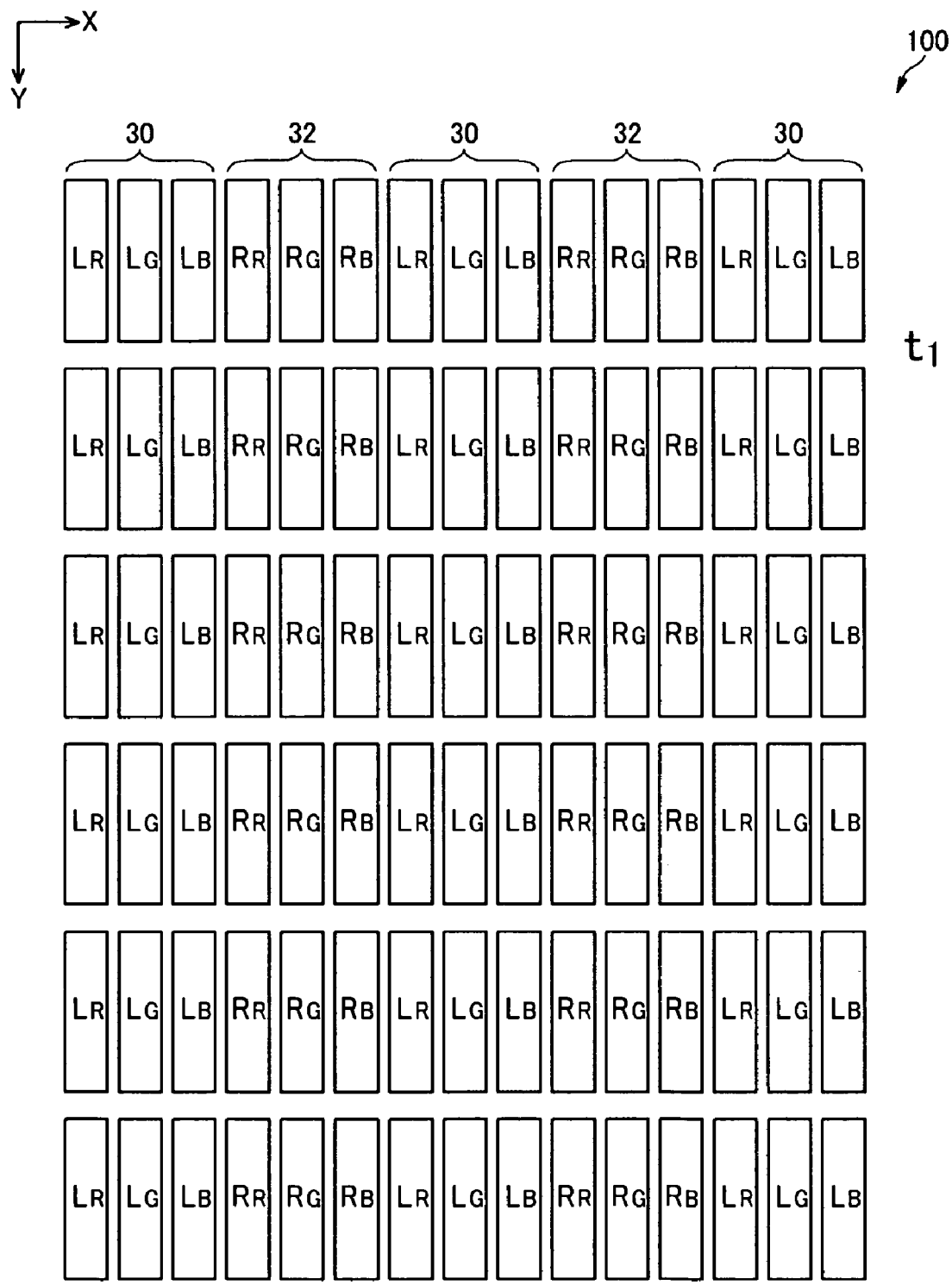
FIGS. 3A and 3B are schematic views of pixel arrays of an image display portion in the first exemplary embodiment of the present invention.
Figure 3B:
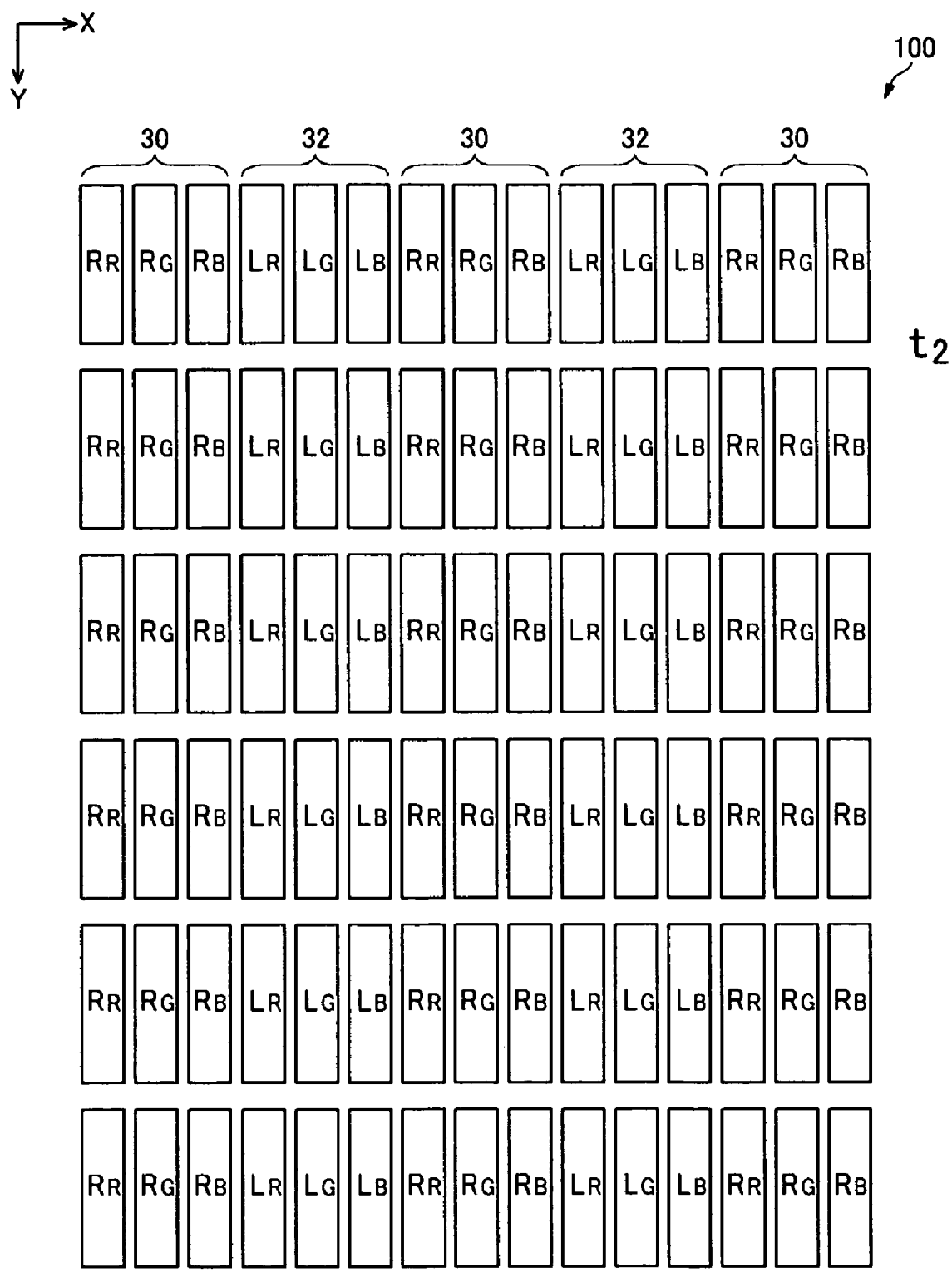

Pixel arrays and an operation of the image display portion will be described hereinafter in more detail. FIGS. 3A and 3B show the pixel arrays of the image display portion in the first exemplary embodiment of the present invention during a first period $t_1$ and a second period $t_2$, respectively.

First pixel columns 30 and second pixel columns 32, including sub pixels arranged along a vertical direction of the image display portion 100 (the direction of the Y-axis in FIGS. 3A and 3B), are arranged alternately and repeatedly along a horizontal direction of the image display portion 100 (the direction of the X-axis in FIGS. 3A and 3B).

As shown in FIG. 3A, during the first period $t_1$, the first pixel columns 30 display left eye images $L_R$, $L_G$, and $L_B$ corresponding to a left eye image signal, and the second pixel columns 32 display right eye images $R_R$, $R_G$, and $R_B$ corresponding to a right eye image signal.

In this way, a first image is displayed on the image display portion during the first period $t_1$.

Referring back to FIG. 2, in the first period $t_1$, a driving voltage is applied to the first electrodes 14 at the first connection terminal 14c through the first terminal electrode 14b and the first connection electrode 14a.

A reference voltage, which by way of example may be a ground voltage, is applied to the second electrodes 16 at the second connection terminal 16c through the second connection electrode 16a. The reference voltage is also applied to the common electrode 18.

Accordingly, when the parallax barrier is a liquid crystal display of a normally white mode of transmission, portions of the barrier on which the first electrodes 14 are located become light interception portions, and portions of the barrier on which the second electrodes 16 are located become light transmission portions.

In contrast, when the parallax barrier is a liquid crystal display of a normally black mode of transmission, portions of the barrier on which the first electrodes 14 are located become light transmission portions, and portions of the barrier on which the second electrodes 16 are located become light interception portions.

As shown in FIG. 3B, during the second period $t_2$, the first pixel columns 30 display right eye images $R_R$, $R_G$, and $R_B$ corresponding to a right eye image signal, and the second pixel columns 32 display the left eye images $L_R$, $L_G$, and $L_B$ corresponding to a left eye image signal.

In this way, a second image is displayed on the image display portion during the second period $t_2$. As shown in FIGS. 3A and 3B, the pattern of the first image displayed during the first period $t_1$ is opposite to the pattern of the second image displayed during the second period $t_2$.

Referring back to FIG. 2, in the second period $t_2$, the reference voltage is applied to the first electrodes 14 at the first connection terminal 14c through the first terminal electrode 14b and the first connection electrode 14a.

The driving voltage is applied to the second electrodes 16 at the second connection terminal 16c through the second connection electrode 16a. The reference voltage is also applied to the common electrode 18.

Accordingly, when the parallax barrier is a liquid crystal display of a normally white mode of transmission, portions of the barrier on which the second electrodes 16 are located become light interception portions, and portions of the barrier on which the first electrodes 14 are located become light transmission portions.

In contrast, when the parallax barrier is a liquid crystal display of a normally black mode of transmission, portions of the barrier on which the second electrodes 16 are located become light transmission portions, and portions of the barrier on which the first electrodes 14 are located become light interception portions.

According to the operation of the three-dimensional display device as described above, the left eye of a user sees the image displayed by the first pixel columns 30 during the first period $t_1$ and the image displayed by the second pixel columns 32 during the second period $t_2$.

In contrast, the right eye of the user sees the image displayed by the second pixel columns 32 during the first period $t_1$ and sees the image displayed by the first pixel columns 30 during the second period $t_2$.

Accordingly, the user can see a three-dimensional image having a resolution that is as fine as (or substantially as fine as) a resolution of a two-dimensional image.

The light interception portions formed during the first period $t_1$ and the light interception portions formed during the second period $t_2$ should be characterized by light transmittance rates that are equal (or substantially equal) to each other in order to provide three-dimensional images to the user that are natural in appearance.

Similarly, the light transmission portions formed during the first period $t_1$ and the light transmission portions formed during the second period $t_2$ should be characterized by light transmittance rates that are equal (or substantially equal) to each other.

Therefore, the level of a voltage effectively applied to the first electrodes 14 during the first period $t_1$ and the level of a voltage effectively applied to the second electrodes 16 during the second period $t_2$ should be substantially equal to each other.

However, as shown in FIG. 2, paths from the first and second connection terminals 14c and 16c to the first and second electrodes 14 and 16, respectively, are different in length from each other.

That is, when voltages of a uniform (or equal) level are applied at the first and second connection terminals 14c and 16c, a voltage drop due to the electrical resistance of the first terminal electrode 14b results, and therefore the voltage effectively applied to the first electrodes 14 is substantially lower than that effectively applied to the second electrodes 16.

Accordingly, in the first exemplary embodiment of the present invention, voltages having levels that are different from each other are applied at the first and second connection terminals 14c and 16c. This will be described hereinafter in more detail.

Figure 4:
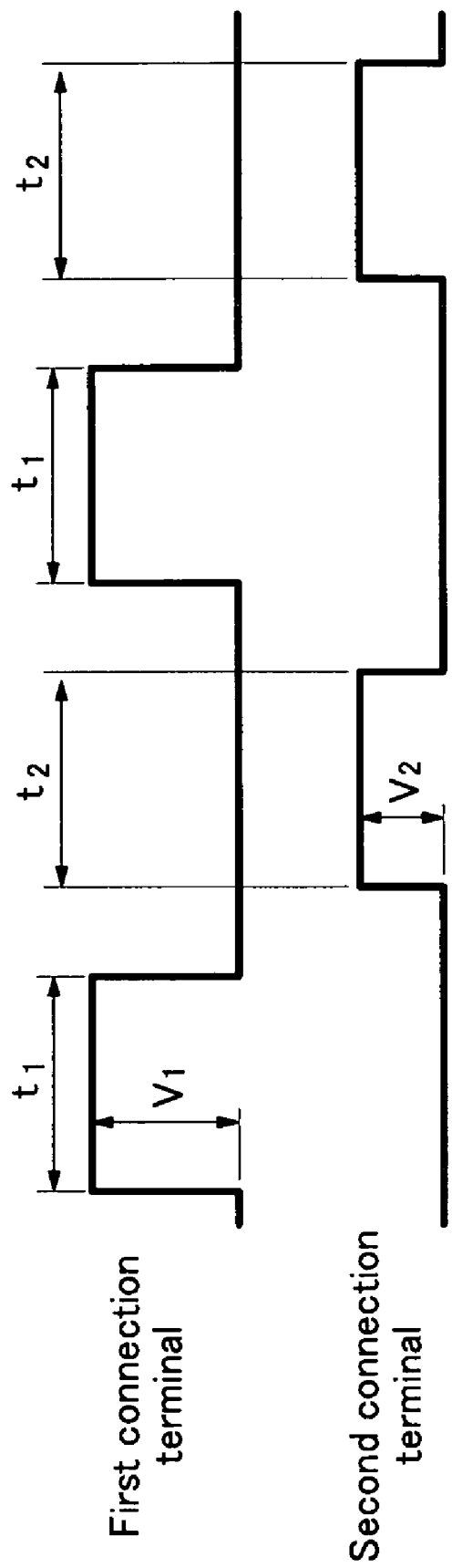
FIG. 4 is a graph of voltages applied to a first connection terminal and a second connection terminal in the first exemplary embodiment of the present invention.

FIG. 4 is a graph showing voltages applied to the first and second connection terminals during an operation of the parallax barrier.

In a manner substantially similar to that described above, during the first period $t_1$, a first driving voltage $V_1$ is applied at the first connection terminal 14c, and a reference voltage is applied at the second connection terminal 16c.

Then, during the second period $t_2$, the reference voltage is applied to the first connection terminal 14c, and a second driving voltage $V_2$ is applied to the second connection terminal 16c.

In this case, the first driving voltage $V_1$ is set to be higher than the second driving voltage $V_2$ to compensate for the resulting voltage drop.

However, when the first driving voltage $V_1$ is less than 1.5 times as high as the second driving voltage $V_2$, it may be difficult to reduce a corresponding difference in brightness due to the resulting voltage drop.

Also, when the first driving voltage $V_1$ is more than twice as high as the second driving voltage $V_2$, too large of a voltage may be effectively applied to the first electrodes 14, and therefore a brightness corresponding to the first electrodes 14 may be stronger than a brightness corresponding to the second electrodes 16 even given the resulting voltage drop over the first terminal electrode 14b.

Thus, to maintain a more consistent level of brightness, in one embodiment of the invention, the first driving voltage $V_1$ applied at the first connection terminal 14c is set to have a range from about 1.5 to 2 times the second driving voltage $V_2$ applied at the second connection terminal 16c.

However, the scope of the present invention is not limited to the range of voltage ratios specified in the first exemplary embodiment. Rather, the value of the voltage ratio can be changed according to a corresponding structure or structures of electrodes and/or corresponding driving conditions in a given embodiment.

According to the driving method of the first exemplary embodiment, since the difference between the voltages effectively applied to the first and second electrodes 14 and 16 resulting from the voltage drop over the electrical resistance of the first terminal electrode 14b may be reduced, the difference in transmission brightness levels produced by the parallax barrier can be reduced.

Figure 5:
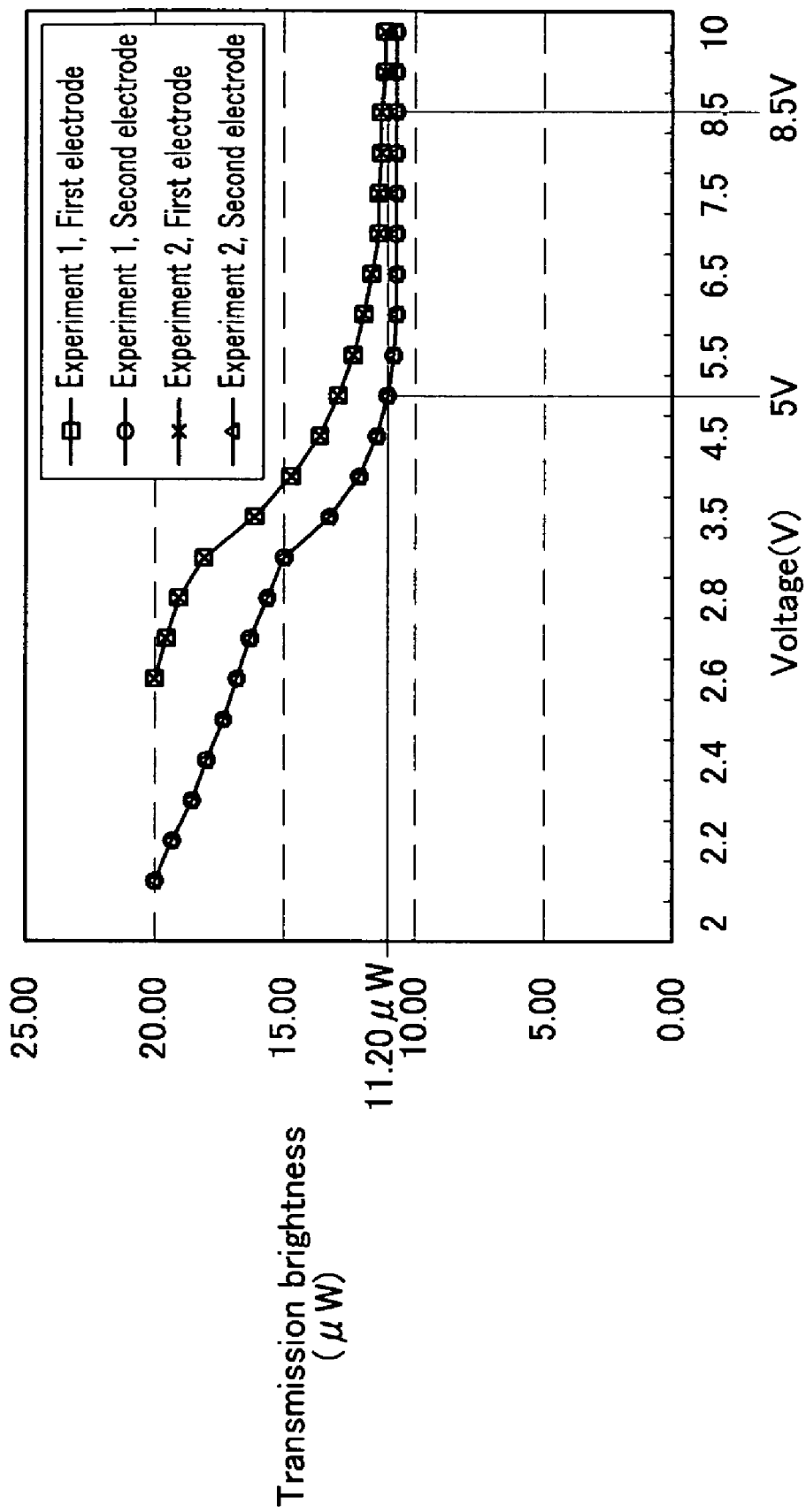
FIG. 5 is a graph showing relationships between transmission brightness and applied voltages in the first exemplary embodiment of the present invention.

Table 1 and FIG. 5 show results of experiments that indicate effectiveness of the driving method of the first exemplary embodiment.

A normally white mode liquid crystal display was made, and transmission brightness according to various voltages applied to each of the electrodes was measured.

Referring to Table 1 and FIG. 5, when voltages of uniform (or equal) levels were applied at the first and second connection terminals, a transmission brightness corresponding to the first electrode was higher than a transmission brightness corresponding to the second electrode.

That is, since a lower voltage was effectively applied to the first electrode than to the second electrode because of a resulting voltage drop, a light transmission rate corresponding to the first electrode was lower than that corresponding to the second electrode, and accordingly a transmission brightness corresponding to the first electrode was higher compared to that corresponding to the second electrode.

However, when a voltage of 5V was applied at the second connection terminal and a voltage of 8.5V was applied at the first connection terminal, levels of transmission brightness corresponding to the first electrode and the second electrode were substantially equal to each other.

TABLE 1

| voltage (V) | transmission brightness(μW) | | | |
|---|---|---|---|---|
| | experiment 1 | | experiment 2 | |
| | the first | the second | the first | the second |
| 2.1 | | 19.91 | | 19.97 |
| 2.2 | | 19.24 | | 19.26 |
| 2.3 | | 18.56 | | 18.61 |
| 2.4 | | 17.96 | | 17.98 |
| 2.5 | | 17.36 | | 17.37 |
| 2.6 | 20.02 | 16.78 | 20.00 | 16.78 |
| 2.7 | 19.53 | 16.25 | 19.51 | 16.24 |
| 2.8 | 19.06 | 15.75 | 19.05 | 15.75 |
| 3 | 18.17 | 14.88 | 18.16 | 14.85 |
| 3.5 | 16.19 | 13.27 | 16.20 | 13.20 |
| 4 | 14.73 | 12.25 | 14.73 | 12.16 |
| 4.5 | 13.66 | 11.60 | 13.67 | 11.52 |
| 5 | 12.91 | 11.20 | 12.91 | 11.13 |
| 5.5 | 12.37 | 10.95 | 12.34 | 10.89 |
| 6 | 11.99 | 10.81 | 11.95 | 10.77 |
| 6.5 | 11.72 | 10.74 | 11.67 | 10.70 |
| 7 | 11.52 | 10.70 | 11.46 | 10.68 |
| 7.5 | 11.37 | 10.70 | 11.30 | 10.68 |
| 8 | 11.27 | 10.72 | 11.20 | 10.70 |
| 8.5 | 11.20 | 10.75 | 11.13 | 10.73 |
| 9 | 11.14 | 10.78 | 11.07 | 10.76 |
| 10 | 11.08 | 10.86 | 11.01 | 10.84 |

Figure 6:
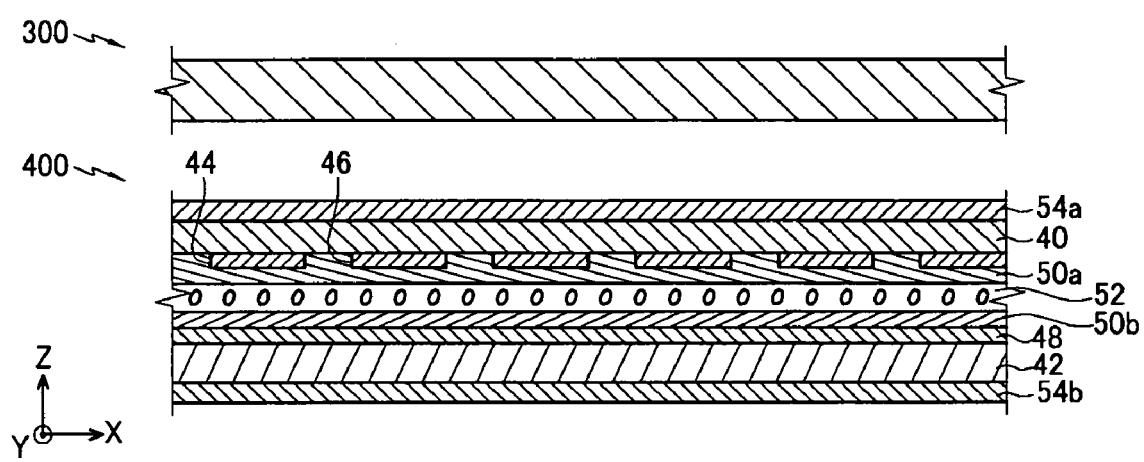
FIG. 6 is a sectional view of a three-dimensional display device operated by a driving method according to a second exemplary embodiment of the present invention.

FIG. 6 is a sectional view showing a three-dimensional display device operated by a driving method according to a second exemplary embodiment of the present invention.

The three-dimensional display device of the second exemplary embodiment can be oriented in either of a first mode providing a portrait-type view and a second mode providing a landscape-type view according to a selection by the user to rotate the image display portion together with the parallax barrier.

As shown in FIG. 6, the three-dimensional display device includes an image display portion 300 and a parallax barrier 400 facing the image display portion 300.

The parallax barrier 400 includes a first substrate 40 and a second substrate 42 facing each other.

In order to drive a liquid crystal layer 52 located between the first and second substrates 40 and 42, first electrodes 44 and second electrodes 46 are formed (or arranged) on the first substrate 10, and third electrodes 48 and fourth electrodes are formed on the second substrate 42.

Since the elements of the three-dimensional display device of the second embodiment, except for the electrodes formed on the second substrate 42, are substantially similar to corresponding elements of the first exemplary embodiment described above, only the structures of the electrodes formed on the second substrate 42 will be described more fully hereinafter.

Figure 7A:
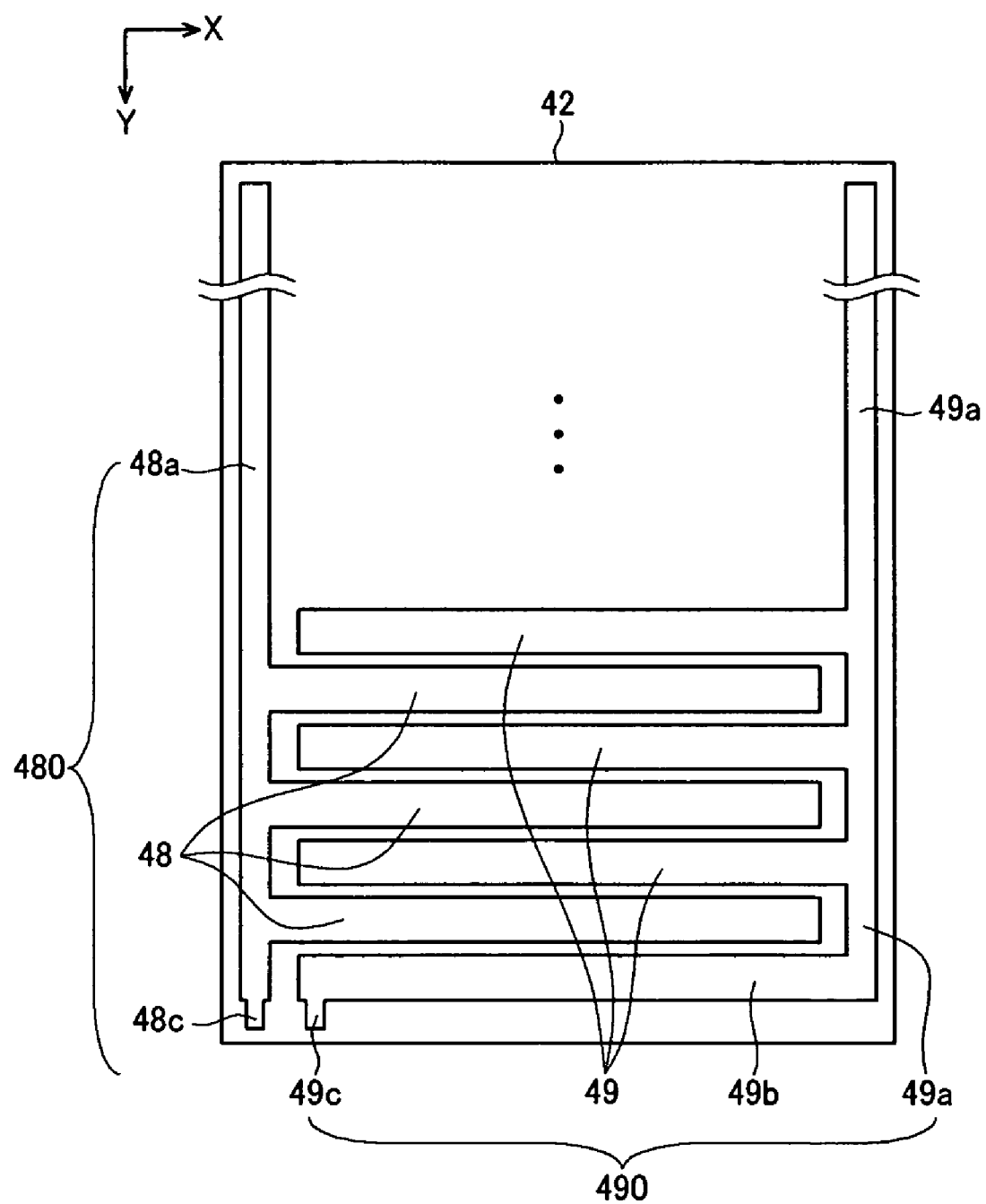
FIGS. 7A and 7B are plan views of electrodes formed on a second substrate.
Figure 7B:
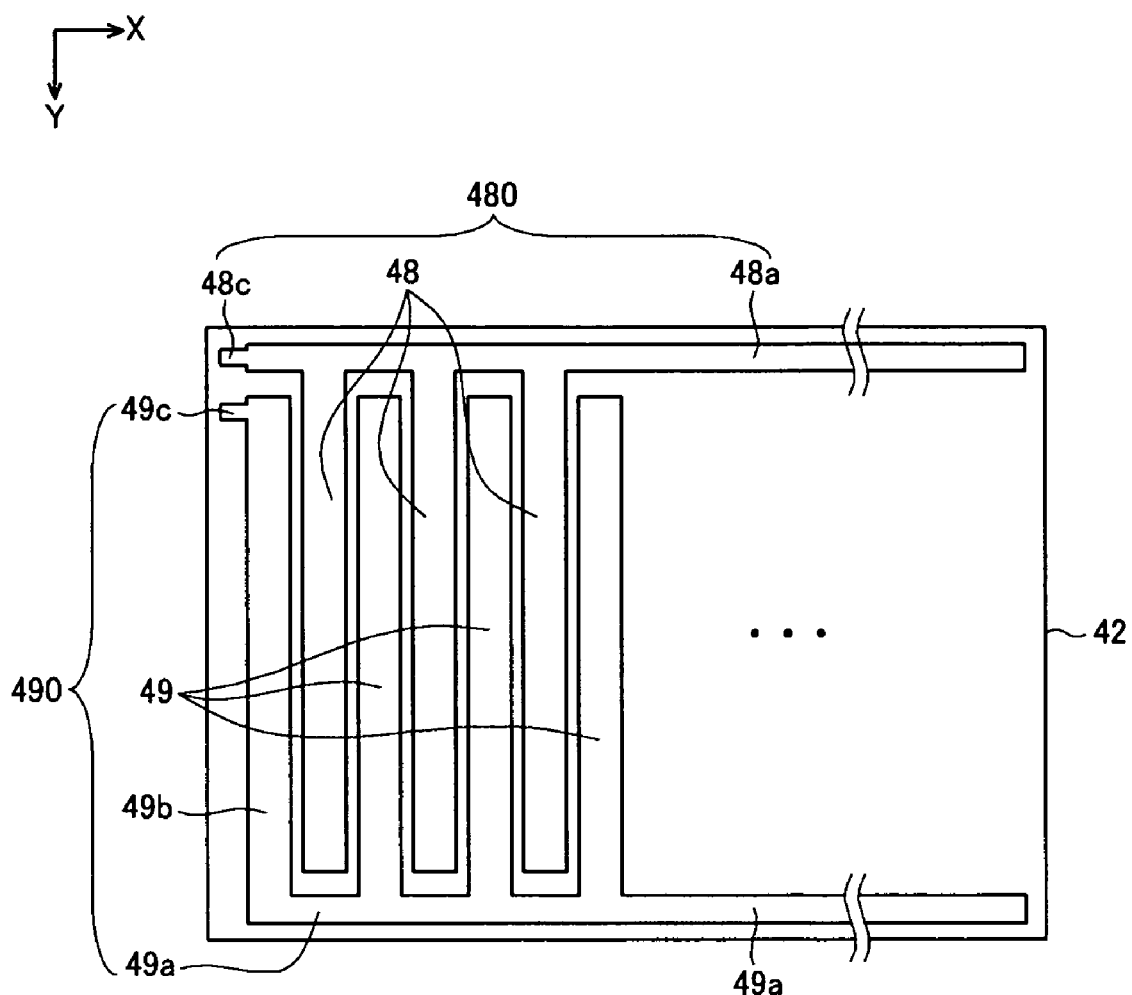

FIGS. 7A and 7B show a third electrode set 480 and a fourth electrode set 490 formed on the second substrate 42. FIG. 7A shows the third and fourth electrode sets as operated in the first mode providing a portrait-type view, and FIG. 7B shows the third and fourth electrode sets as operated in the second mode providing a landscape-type view.

The third electrode set 480 includes a plurality of the third electrodes 48 formed to extend along a direction corresponding to a shorter side of the second substrate 42 (the direction of the X-axis in FIG. 7A), a third connection electrode 48a electrically connecting the third electrodes 48, and a third connection terminal 48c formed on an end of the third connection electrode 48a.

The third electrodes 48 are arranged in a striped pattern with predetermined distances therebetween.

The fourth electrode set 490 includes a plurality of the fourth electrodes 49 arranged to extend along a direction corresponding to the shorter side of the second substrate 42, a fourth connection electrode 49a electrically connecting the fourth electrodes 49, a fourth terminal electrode 49b formed to extend along a direction parallel to the fourth electrodes 49 on an end of the fourth connection electrode 49a, and a fourth connection terminal 49c located on an end of the fourth terminal electrode 49b.

The fourth electrodes 49 are arranged between the third electrodes 48 in a striped pattern on the second substrate 42.

Pixel arrays and an operation of the image display portion will be described hereinafter in more detail. As described above, the three-dimensional display device according to the second exemplary embodiment of the present invention can be operated in either of the first mode and the second mode.

Since the pixel arrays and the operation of the image display portion in the first mode are substantially similar to those described above with respect to the first exemplary embodiment, only the pixel arrays and the operation of the image display portion in the second mode will be described hereinafter in more detail.

Figure 8A:
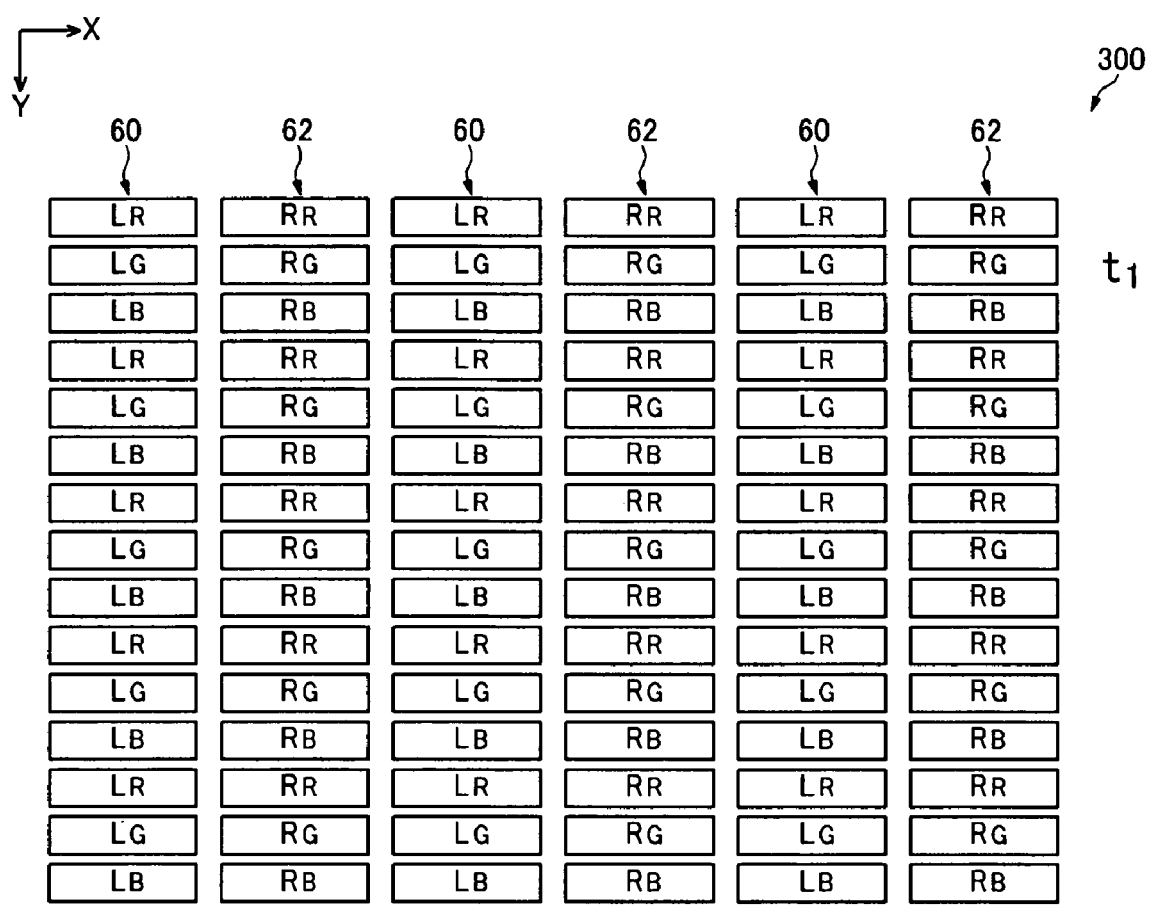
FIGS. 8A and 8B are schematic views of pixel arrays of an image display portion in the second exemplary embodiment of the present invention in a second mode.
Figure 8B:
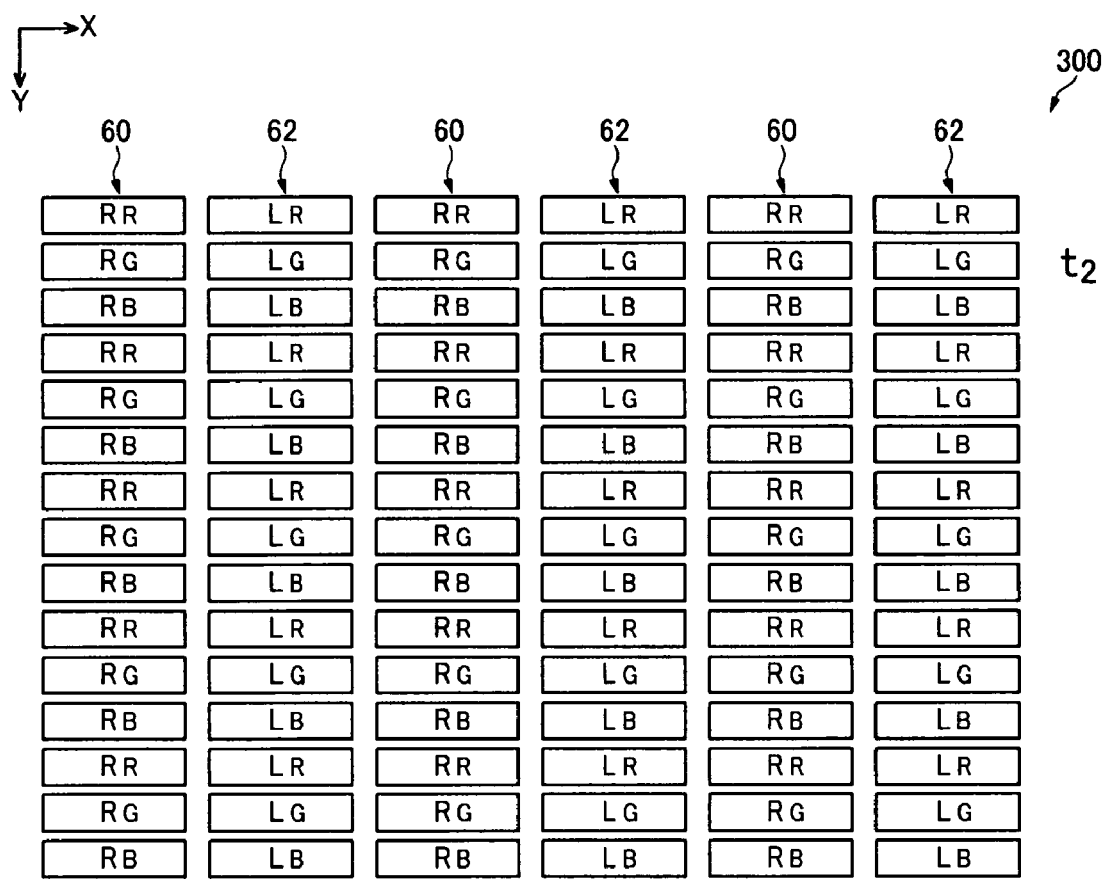

FIG. 8A and FIG. 8B show the pixel arrays of the image display portion in the second mode during a first period $t_1$ and a second period $t_2$, respectively.

First pixel rows 60 and second pixel rows 62, including sub pixels arranged along a vertical direction of the image display portion 300 (the direction of the Y-axis in FIG. 8A), are arranged alternately and repeatedly along a horizontal direction of the image display portion 300 (the direction of the X-axis in FIGS. 8A and 8B).

As shown in FIG. 8A, during the first period $t_1$, the first pixel rows 60 display left eye images $L_R$, $L_G$, and $L_B$ corresponding to a left eye image signal, and the second pixel rows 62 display right eye images $R_R$, $R_G$, and $R_B$ corresponding to a right eye image signal.

A third image is displayed on the image display portion during the first period $t_1$ in this way.

Referring back to FIG. 7B, in the first period $t_1$, a driving voltage is applied to the third electrodes 48 at the third connection terminal 48c through the third connection electrode 48a.

A reference voltage is applied to the fourth electrodes 49 at the fourth connection terminal 49c through the fourth terminal electrode 49b and the fourth connection electrode 49a.

In the second mode, a reference voltage is applied to the first and second electrodes formed on the first substrate (see FIG. 6, for example) such that the first and second electrodes serve as a common, single-body electrode substantially similar to the common electrode 18 in the first exemplary embodiment.

Accordingly, when the parallax barrier is a liquid crystal display of a normally white mode of transmission, portions of the barrier on which the third electrodes 48 are located become light interception portions, and portions of the barrier on which the fourth electrodes 49 are located become light transmission portions.

In contrast, when the parallax barrier is a liquid crystal display of a normally black mode of transmission, portions of the barrier on which the third electrodes 48 are located become light transmission portions, and portions of the barrier on which the fourth electrodes 49 are located become light interception portions.

As shown in FIG. 8B, during the second period $t_2$, the first pixel rows 60 display right eye images $R_R$, $R_G$, and $R_B$ corresponding to a right eye image signal, and the second pixel rows 62 display left eye images $L_R$, $L_G$, and $L_B$ corresponding to a left eye image signal.

A fourth image is displayed on the image display portion during the second period $t_2$ in this way. The pattern of the third image displayed during the first period $t_1$ is opposite to the pattern of the fourth image displayed during the second period $t_2$.

Referring back to FIG. 7B, in the first period $t_2$, the reference voltage is applied to the third electrodes 48 at the third connection terminal 48c through the third connection electrode 48a.

The driving voltage is applied to the fourth electrodes 49 at the fourth connection terminal 49c through the fourth terminal electrode 49b and the fourth connection electrode 49a.

Similar to the situation of the first period $t_1$, the reference voltage is applied to both the first and second electrodes formed on the first substrate such that the first and second electrodes serve as a common, single-body electrode.

Thus, when the parallax barrier is a liquid crystal display of a normally white mode of transmission, portions of the barrier on which the fourth electrodes 49 are located serve as light interception portions, and portions of the barrier on which the third electrodes 48 are located serve as light transmission portions.

In contrast, when the parallax barrier is a liquid crystal display of a normally black mode of transmission, portions of the barrier on which the fourth electrodes 49 are located serve as light transmission portions, and portions of the barrier on which the third electrodes 48 are located serve as light interception portions.

According to the described-above operation of the three-dimensional display device, the left eye of a user sees the image displayed by the first pixel rows 60 during the first period $t_1$ and sees the image displayed by the second pixel rows 62 during the second period $t_2$.

The right eye of the user sees the image displayed by the second pixel rows 62 during the first period $t_1$ and sees the image displayed by the first pixel rows 60 during the second period $t_2$.

Accordingly, the user can see a three-dimensional image having a resolution that is as fine as a resolution of a two-dimensional image.

The light interception portions formed during the first period $t_1$ and the light interception portions formed during the second period $t_2$ should be characterized by light transmittance rates that are substantially equal to each other in order to provide three-dimensional images to the user that are natural in appearance.

Similarly, the light transmission portions formed during the first period $t_1$ and the light transmission portions formed during the second period $t_2$ should be characterized by light transmittance rates that are substantially equal to each other.

Therefore, the level of a voltage effectively applied to the third electrodes 48 during the first period $t_1$ and the level of a voltage effectively applied to the fourth electrodes 49 during the second period $t_2$ should be substantially equal to each other.

However, as shown in FIGS. 7A and 7B, paths from the third and fourth connection terminals 48c and 49c to each of the third and fourth electrodes 48 and 49, respectively, are different in length from each other.

That is, when voltages of a uniform level are applied at the third and fourth connection terminals 48c and 49c, a voltage drop due to the electrical resistance of the fourth terminal electrode 49b results, and therefore the voltage effectively applied to the fourth electrodes 49 is substantially lower than that effectively applied to the third electrodes 48.

Accordingly, in the second exemplary embodiment of the present invention, voltages having levels that are different from each other are applied at the third and fourth connection terminals 48c and 49c. This will be described hereinafter in more detail.

Figure 9:
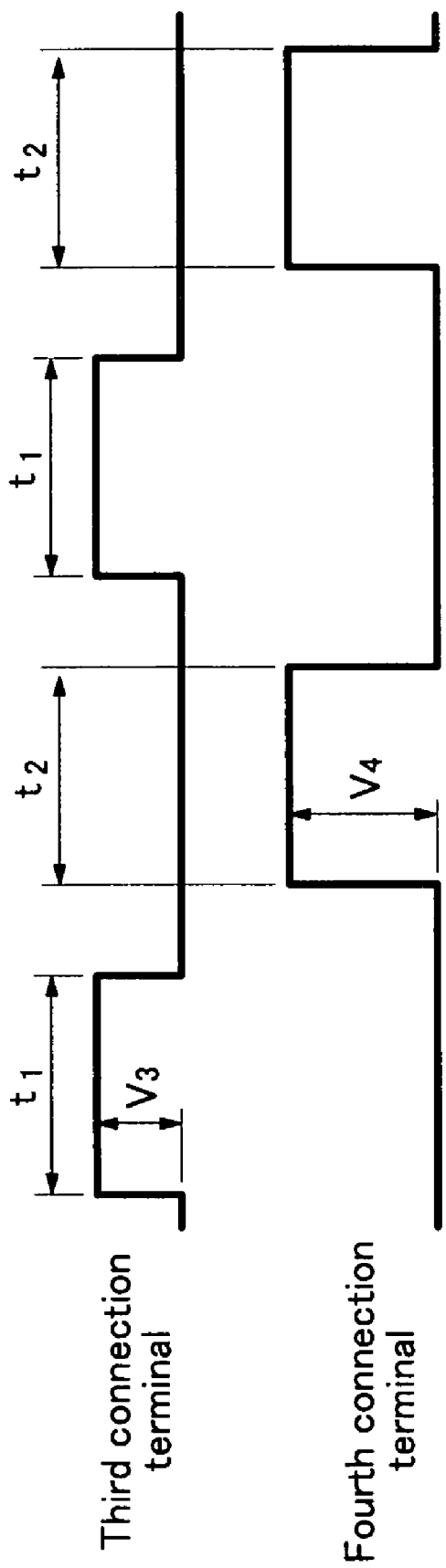
FIG. 9 is a graph showing voltages applied to a third and a fourth connection terminal in the second exemplary embodiment of the present invention.

FIG. 9 is a graph showing voltages applied to the third and fourth connection terminals respectively during an operation of the parallax barrier.

As described above, during the first period $t_1$, a third driving voltage $V_3$ is applied at the third connection terminal 48c, and a reference voltage is applied at the fourth connection terminal 49c.

Then, during the second period $t_2$, the reference voltage is applied at the third connection terminal 48c, and a fourth driving voltage $V_4$ is applied at the fourth connection terminal 49c.

In this case, the fourth driving voltage $V_4$ is set to be higher than the third driving voltage $V_3$ to compensate for the resulting voltage drop.

However, when the fourth driving voltage $V_4$ is less than 1.5 times as high as the third driving voltage $V_3$, it may be difficult to reduce the difference of brightness due to the resulting voltage drop.

When the fourth driving voltage $V_4$ is more than twice as high as the third driving voltage $V_3$, too large of a voltage may be effectively applied to the fourth electrodes 49, even given the resulting voltage drop over the fourth terminal electrode 49b, and a brightness corresponding to the fourth electrodes 49 may be stronger than a brightness corresponding to the third electrodes 48.

Thus, to maintain a more consistent level of brightness, the fourth driving voltage $V_4$ that is applied at the fourth connection terminal 49c may be set to have a range from about 1.5 to 2 times the third driving voltage $V_3$ that is applied at the third connection terminal 48c.

However, the scope of the present invention is not limited to the range of voltage ratios specified above. Rather, the value of the voltage ratio can be changed according to a corresponding structure or structures of electrodes and/or corresponding driving conditions in a given embodiment.

According to the driving method of the second exemplary embodiment, since the difference between the voltages effectively applied to the third and fourth electrodes 48 and 49 resulting from the voltage drop over the electrical resistance of the fourth terminal electrode 49b may be reduced, the difference in transmission brightness levels produced by the parallax barrier can be reduced.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A driving method of a three-dimensional display device including
an image display portion adapted to time-share an image to display a left eye image and a right eye image, and
a parallax barrier for receiving the left eye image and the right eye image from the image display portion and for directing the left eye image and the right eye image towards a left eye and a right eye of a user, respectively, by operating a first electrode set of the parallax barrier and a second electrode set of the parallax barrier,
the driving method comprising:
applying a first driving voltage to the first electrode set during a first period, the first driving voltage having a first level; and
applying a second driving voltage to the second electrode set during a second period, the second driving voltage having a second level,
wherein the second level is different from the first level.

2. The driving method of claim 1,
wherein the parallax barrier comprises:
a first substrate on which the first electrode set and the second electrode set are arranged;
a second substrate facing the first substrate;
a common electrode arranged on the second substrate; and
a liquid crystal layer located between the first substrate and the second substrate, wherein the first electrode set comprises:
a plurality of first electrodes;
a first connection electrode for electrically connecting the first electrodes;
a first terminal electrode connected at an end of the first connection electrode; and
a first connection terminal connected to an end of the first terminal electrode and adapted to receive the first driving voltage;
wherein the second electrode set comprises:
a plurality of second electrodes;
a second connection electrode for electrically connecting the second electrodes; and
a second connection terminal connected to an end of the second connection electrode and adapted to receive the second driving voltage;
wherein the applying the first driving voltage to the first electrode set comprises applying the first driving voltage at the first connection terminal,
wherein the applying the second driving voltage to the second electrode set comprises applying the second driving voltage at the second connection terminal, and
wherein the first level is set higher than the second level.

3. The driving method of claim 2, wherein the first driving voltage and the second driving voltage are externally provided.

4. The driving method of claim 2, wherein the first level is set to have a range from about 1.5 to 2 times the second level.

5. The driving method of claim 2, further comprising:
displaying on the image display portion, during the first period, a first image including the left and right eye images formed in a first pattern; and
displaying on the image display portion, during the second period, a second image including the left and right eye images formed in a second pattern,
wherein the second pattern is opposite to the first pattern.

6. The driving method of claim 5, further comprising:
forming first pixel columns and second pixel columns respectively corresponding to the first electrodes and the second electrodes,
wherein the displaying the first image comprises displaying the left eye image of the first image on the first pixel columns and displaying the right eye image of the first image on the second pixel columns, and
wherein the displaying the second image comprises displaying the right eye image of the second image on the first pixel columns and displaying the left eye image of the second image on the second pixel columns.

7. A driving method of a three-dimensional display device including
an image display portion capable of being oriented in a first mode to provide a portrait-type view and in a second mode to provide a landscape-type view and adapted to time-share an image to display a left eye image and a right eye image in a time-shared manner, and
a parallax barrier having a first electrode set and a second electrode set arranged to extend along a first direction and further having a third electrode set and a fourth electrode set arranged to extend along a second direction perpendicular to the first direction,
the parallax barrier adapted to receive the left eye image and the right eye image from the image display portion and to direct the left eye image and the right eye image toward a left eye and a right eye of a user, respectively,
the driving method comprising:
in the first mode, applying a first driving voltage to the first electrode set during a first period, the first driving voltage having a first level, and applying a second driving voltage to the second electrode set during a second period, the second driving voltage having a second level different from the first level; and
in the second mode, applying a third driving voltage to the third electrode set during the first period, the third driving voltage having a third level, and applying a fourth driving voltage to the fourth electrode set during the second period, the fourth driving voltage having a fourth level different from the third level.

8. The driving method of claim 7, wherein the parallax barrier comprises:
a first substrate on which the first electrode set and the second electrode set are arranged;
a second substrate on which the third electrode set and the fourth electrode set are arranged, the second substrate facing the first substrate; and
a liquid crystal layer located between the first and second substrates,
the first electrode set including
a plurality of first electrodes,
a first connection electrode for electrically connecting the first electrodes,
a first terminal electrode connected at an end of the first connection electrode, and
a first connection terminal connected to an end of the first terminal electrode and adapted to receive the first driving voltage,
the second electrode set including
a plurality of second electrodes,
a second connection electrode for electrically connecting the second electrodes and a second connection terminal connected to an end of the second connection electrode and adapted to receive the second driving voltage, the third electrode set including
a plurality of third electrodes,
a third connection electrode for electrically connecting the third electrodes, and
a third connection terminal connected to an end of the third connection electrode and adapted to receive the third driving voltage, and the fourth electrode set including
a plurality of fourth electrodes,
a fourth connection electrode for electrically connecting the fourth electrodes,
a fourth terminal electrode connected to an end of the fourth connection electrode, and
a fourth connection terminal connected to an end of the fourth terminal electrode and adapted to receive the fourth driving voltage, wherein, in the first mode, the applying the first driving voltage to the first electrode set during the first period comprises applying the first driving voltage at the first connection terminal during the first period, and the applying the second driving voltage to the second electrode set during the second period comprises applying the second driving voltage at the second connection terminal during the second period, wherein, in the second mode, the applying the third driving voltage to the third electrode set during the first period comprises applying the third driving voltage at the third connection terminal during the first period, and the applying the fourth driving voltage to the fourth electrode set during the second period comprises applying the fourth driving voltage at the fourth connection terminal during the second period, wherein, in the first mode, the first level is set higher than the second level, and wherein, in the second mode, the fourth level is set higher than the third level.

9. The driving method of claim 8, wherein the first driving voltage, the second driving voltage, the third driving voltage, and the fourth driving voltage are externally provided.

10. The driving method of claim 8, wherein, in the first mode, the first level is set to have a range from about 1.5 to 2 times the second level, and wherein, in the second mode, the fourth level is set to have a range from about 1.5 to 2 times the third level.

11. The driving method of claim 8, further comprising:
in the first mode,
displaying on the image display portion, during the first period, a first image including the left and right eye images formed in a first pattern, and
displaying on the image display portion, during the second period, a second image including the left and right eye images formed in a second pattern,
wherein the second pattern is opposite to the first pattern; and
in the second mode,
displaying on the image display portion, during the first period, a third image including the left and right eye images formed in a third pattern, and
displaying on the image display portion, during the second period, a fourth image including the left and right eye images formed in a fourth pattern,
wherein the fourth pattern is opposite to the third pattern.

12. The driving method of claim 11, further comprising:
in the first mode,
forming first pixel columns and second pixel columns respectively corresponding to the first electrodes and the second electrodes,
wherein the displaying the first image during the first period comprises displaying the left eye image of the first image on the first pixel columns and displaying the right eye image of the first image on the second pixel columns, and
wherein the displaying the second image during the second period comprises displaying the right eye image of the second image on the first pixel columns and displaying the left eye image of the second image on the second pixel columns; and
in the second mode,
forming first pixel rows and second pixel rows respectively corresponding to the third electrodes and the fourth electrodes,
wherein the displaying the third image during the first period comprises displaying the left eye image of the third image on the first pixel rows and displaying the right eye image of the third image on the second pixel rows, and
wherein the displaying the fourth image during the second period comprises displaying the right eye image of the fourth image on the first pixel rows and displaying the left eye image of the fourth image on the second pixel rows.

13. A driving method of a three-dimensional display device including
an image display portion adapted to time-share an image to display a left eye image and a right eye image, and
a parallax barrier for receiving the left eye image and the right eye image from the image display portion and for directing the left eye image and the right eye image towards a left eye and a right eye of a user, respectively, by operating a first electrode set of the parallax barrier and a second electrode set of the parallax barrier,
the driving method comprising:
applying a first driving voltage to the first electrode set during a first period, the first driving voltage having a first level; and
applying a second driving voltage to the second electrode set during a second period, the second driving voltage having a second level,
wherein the application of the first driving voltage produces a voltage drop over a terminal electrode of the first electrode set, and
wherein the first level is set relative to the second level to compensate for the voltage drop over the terminal electrode of the first electrode set.

14. The driving method of claim 13, wherein the first level is set higher than the second level.

15. The driving method of claim 13,
wherein the first electrode set and the second electrode set are arranged along a first direction,
wherein a third electrode set and a fourth electrode set of the parallax barrier are arranged in a second direction perpendicular to the first direction, wherein the driving method further comprises:
in an alternative mode of operation,
  applying a third driving voltage to the third electrode set during the first period, the third driving voltage having a third level; and
  applying a fourth driving voltage to the fourth electrode set during the second period, the fourth driving voltage having a fourth level,
  wherein the application of the fourth driving voltage produces a voltage drop over a terminal electrode of the fourth electrode set, and
  wherein the fourth level is set relative to the third level to compensate for the voltage drop over the terminal electrode of the fourth electrode set.

16. The driving method of claim 15, wherein, in the alternative mode of operation, the fourth level is set higher than the third level.

* * * * *

UNITED STATES PATENT AND TRADEMARK OFFICE
CERTIFICATE OF CORRECTION

PATENT NO. : 7,733,296 B2  
APPLICATION NO. : 11/606501  
DATED : June 8, 2010  
INVENTOR(S) : Hyo-Jin Lee et al.

Page 1 of 1

It is certified that error appears in the above-identified patent and that said Letters Patent is hereby corrected as shown below:

In the Claims

Column 14, Claim 8, line 67      Delete "electrodes"  
     Insert -- electrodes, --

Signed and Sealed this  
Second Day of October, 2012

David J. Kappos  
*Director of the United States Patent and Trademark Office*